United States Patent [19]
Teng

[11] Patent Number: 5,143,398
[45] Date of Patent: Sep. 1, 1992

[54] COLLAPSIBLE STRUCTURE FOR A STROLLER

[76] Inventor: Jerry M. S. Teng, 24-8, Hsu-Chung Ying, Chung-Jung Tsun, An-Ting Hsiang, Tai-Nan Hsien, Taiwan

[21] Appl. No.: 725,497

[22] Filed: Jul. 3, 1991

[51] Int. Cl.5 ............................................. B62B 7/08
[52] U.S. Cl. ................................... 280/642; 280/650
[58] Field of Search ............... 280/642, 644, 647, 650, 280/658

[56] References Cited

U.S. PATENT DOCUMENTS 4,632,421 12/1986 Shamie ................................ 280/642
4,907,818 3/1990 Chai ..................................... 280/642

FOREIGN PATENT DOCUMENTS 0297372 11/1989 Japan ................................... 280/642

Primary Examiner—David M. Mitchell
Attorney, Agent, or Firm—Morton J. Rosenberg; David I. Klein

[57] ABSTRACT

This invention relates to an improved collapsible structure for a stroller, mainly comprising an engaging member and a seat member on the rear leg, a limit block on the back rest, a leaf spring in the seat member, and a spring in the engaging member, whereby when the user applies a force on the seat member to press the leaf spring, the engaging member will be moved by the connection between the engaging member and the seat member as well as the connection between the limit block and the seat member and therefore enabling the stroller to be collapsed.

4 Claims, 8 Drawing Sheets

COLLAPSIBLE STRUCTURE FOR A STROLLER

BACKGROUND OF THE INVENTION

Most strollers on the present market are collapsible. However, the collapsible structure for prior art strollers is too simple in construction and is liable to cause accidents. This is because the controlling lever of the prior art may be operated inadvertently thereby collapsing the stroller suddenly and causing hurt to the baby therein. In order to enable the Examiner to understand the collapsible structure and function of the prior art stroller, the structure and principle thereof are shown in FIGS. 7 and 8. The prior art stroller may be roughly divided into front leg A, rear leg B, back rest D, handle grip C, and seat support I and J. The handle grip C is pivotally connected with the back rest D on which there is an engaging hook 81 controlled by a lever 82. The engaging hook 81 is connected with a pin 83 in engaging state. When it is desired to collapse the stroller, simply press the lever 82 detaching the engaging hook 81 from the pin 83 and the stroller may be collapsed. However, since the lever 82 is disposed at an easily accessible position, the lever 82 is often inadvertently pressed thus collapsing the stroller suddenly and possibly injuring the baby therein. This is the most important problem that the manufacturers must overcome.

For the above reasons, the applicant designs a novel and improved collapsible structure for a stroller which may obviate and mitigate the above-mentioned drawback.

SUMMARY OF THE INVENTION

This invention relates to an improved collapsible structure for a stroller.

It is the primary object of the present invention to provide a collapsible structure for a stroller which is easy to operate.

It is another object of the present invention to provide a collapsible structure for a stroller which is safe in use.

It is still another object of the present invention to provide a collapsible structure for a stroller which is simple in construction.

It is still another object of the present invention to provide a collapsible structure for a stroller which is fit for mass production.

Other objects and merits and a fuller understanding of the present invention will be obtained by those having ordinary skill in the art when the following detailed description is read in conjunction with the accompanying drawings.

DETAILED DESCRIPTION OF THE PREFERRED EMBODIMENT

Figure 1:
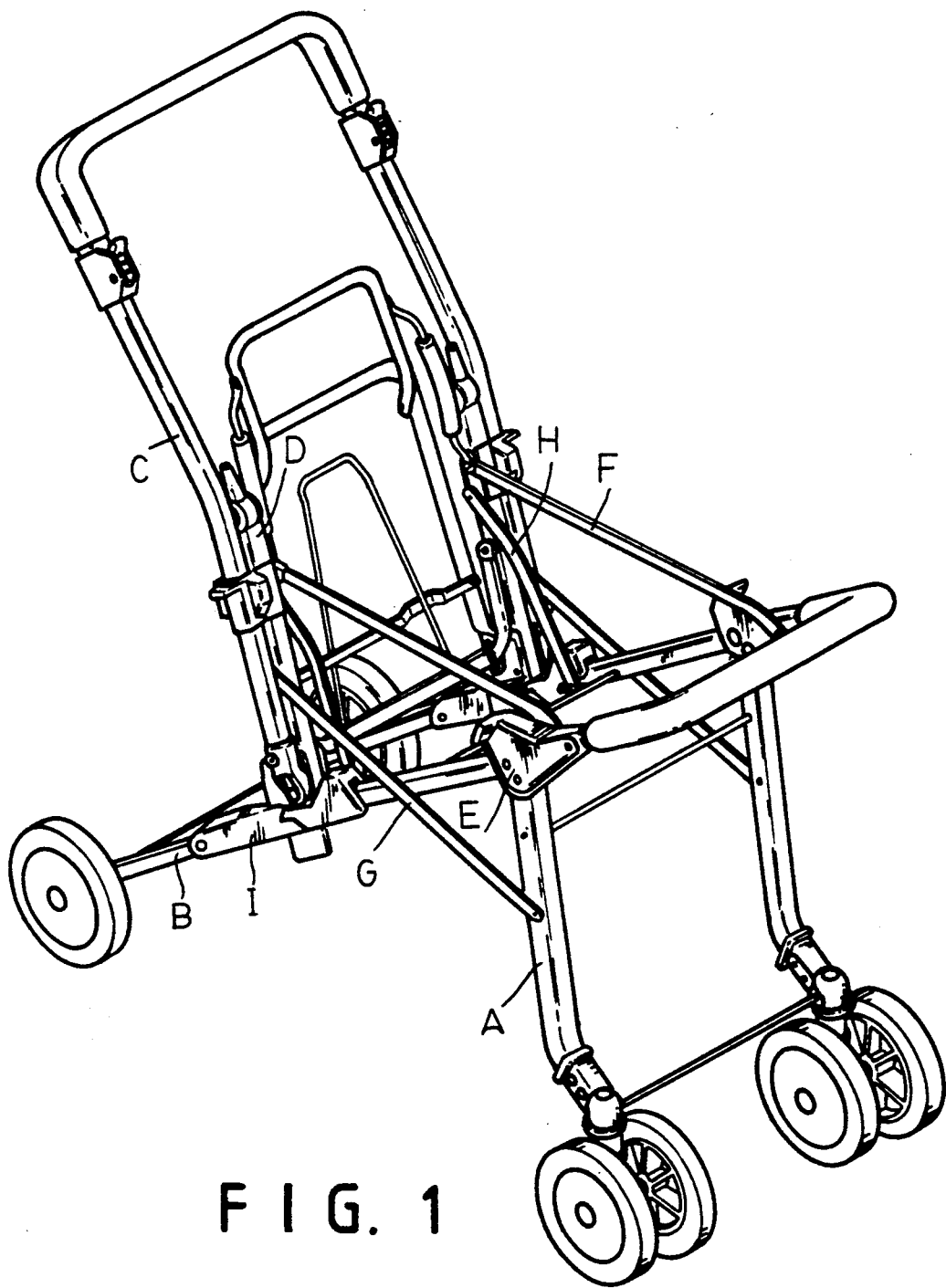
FIG. 1 is a perspective view of the present invention.
Figure 2:
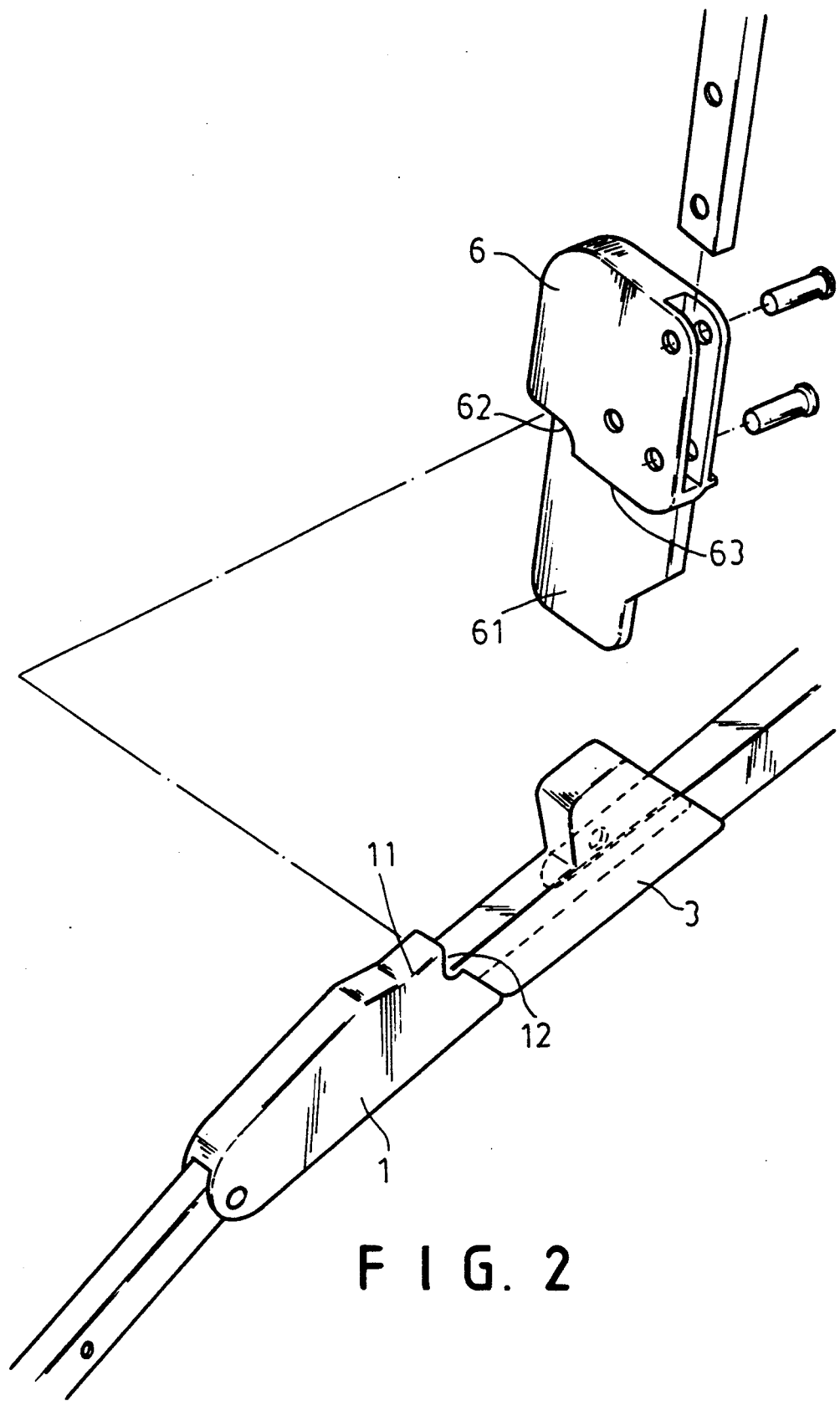
FIG. 2 shows the structure of the present invention.
Figure 3:
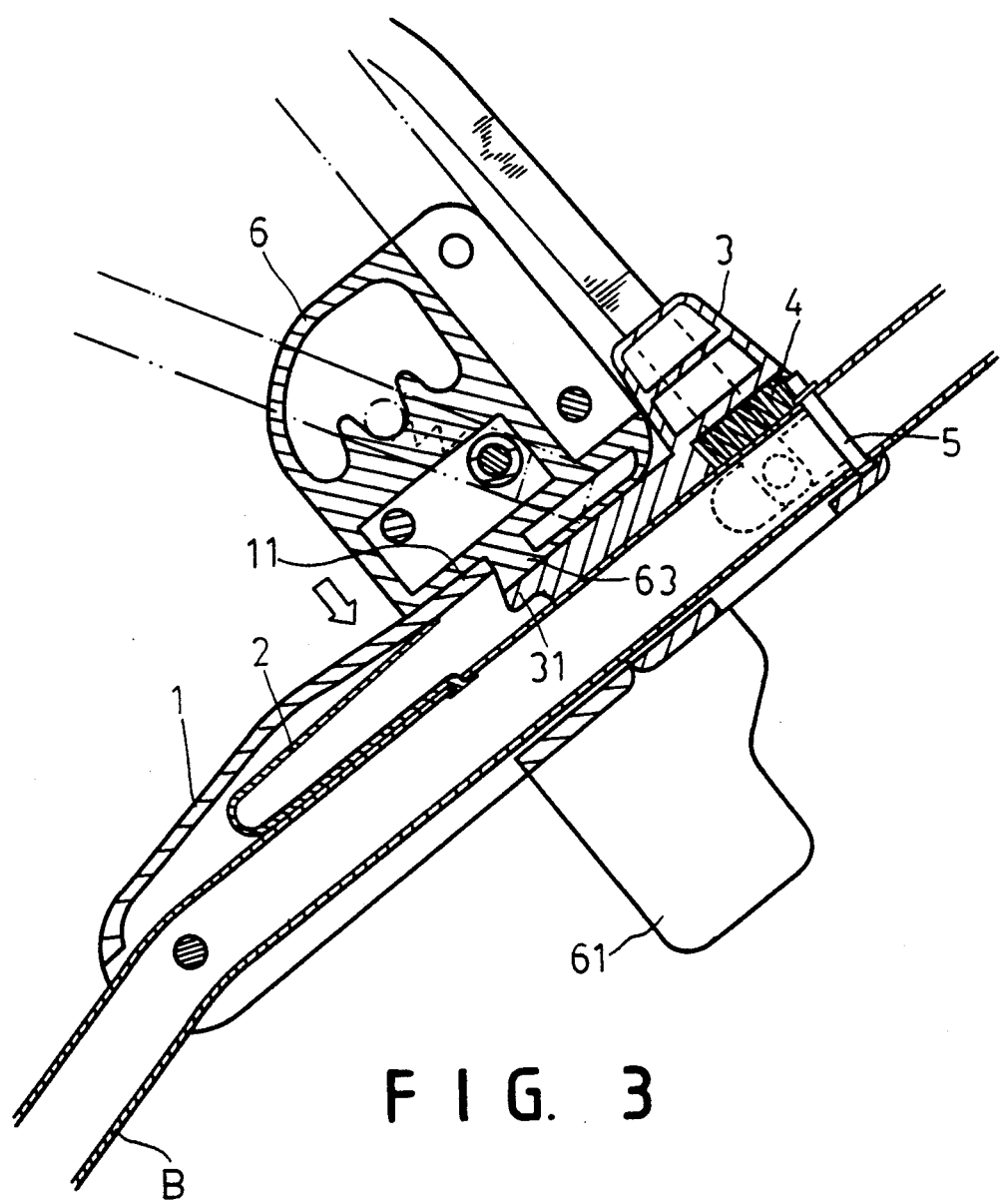
FIG. 3 is a sectional view showing the structure of the present invention.

With reference to FIGS. 1, 2 and 3, the present invention has the same framework as the prior art and is basically composed of two front legs A, two rear legs B, a push frame C, and a back rest D. The front leg A is connected with the rear leg B through a pivot member E on which there is an arm rest F pivotally connected with the back rest D. Further, the front leg A is pivotally connected with the back rest D via a linking rod G, while the rear leg B pivotally connected with the back rest D via a link H. By means of the above-mentioned pivotal connections, the stroller may be expanded or collapsed easily.

The rear leg B is provided with a seat member 1 which is riveted on the rear leg B at one end and has a raised flat surface 11 at the other. The lower edge of the raised flat surface 11 is formed with a recess 12. A leaf spring 2 is mounted on the rear leg B and disposed within the seat member 1. In case of external force, the leaf spring 2 pushes upward the seat member 1 at the end with the raised flat surface 11. The rear leg B is further provided with an engaging member 3 which has a flange 31 at the end against the raised flat surface 11 of the seat member 1 and a chamber at the other for receiving a spring 4. One end of the spring 4 bears against the inner end of the chamber while the other end of the spring 4 is stopped by a pin 5 so that the engaging member 3 may be moved along the rear leg B. The bottom of the back rest D is provided with a limit block 6 which has a lower actuating portion 61, a notch 62 and a stop edge 63.

Figure 4:
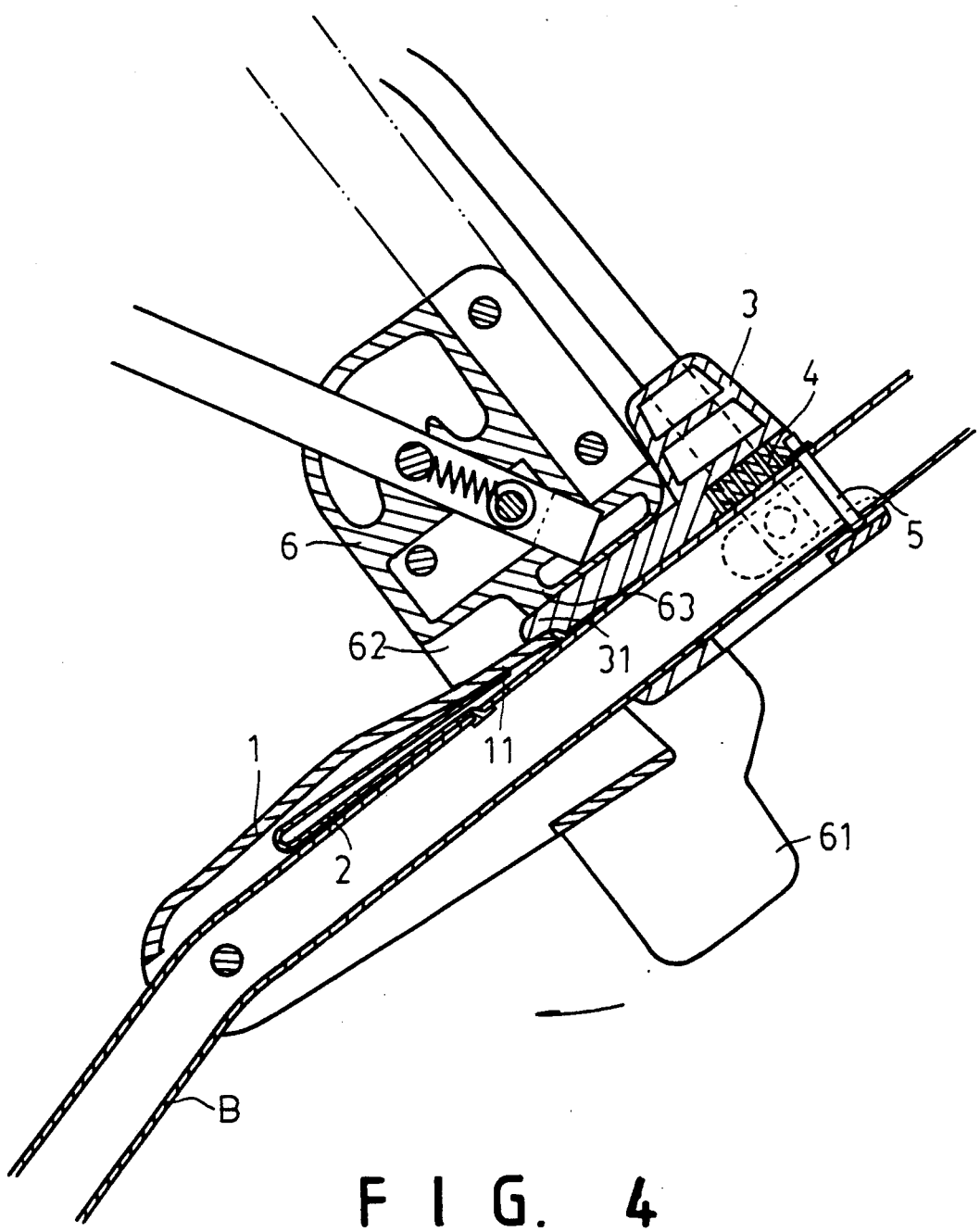
FIG. 4 shows the principle of the present invention.
Figure 5:
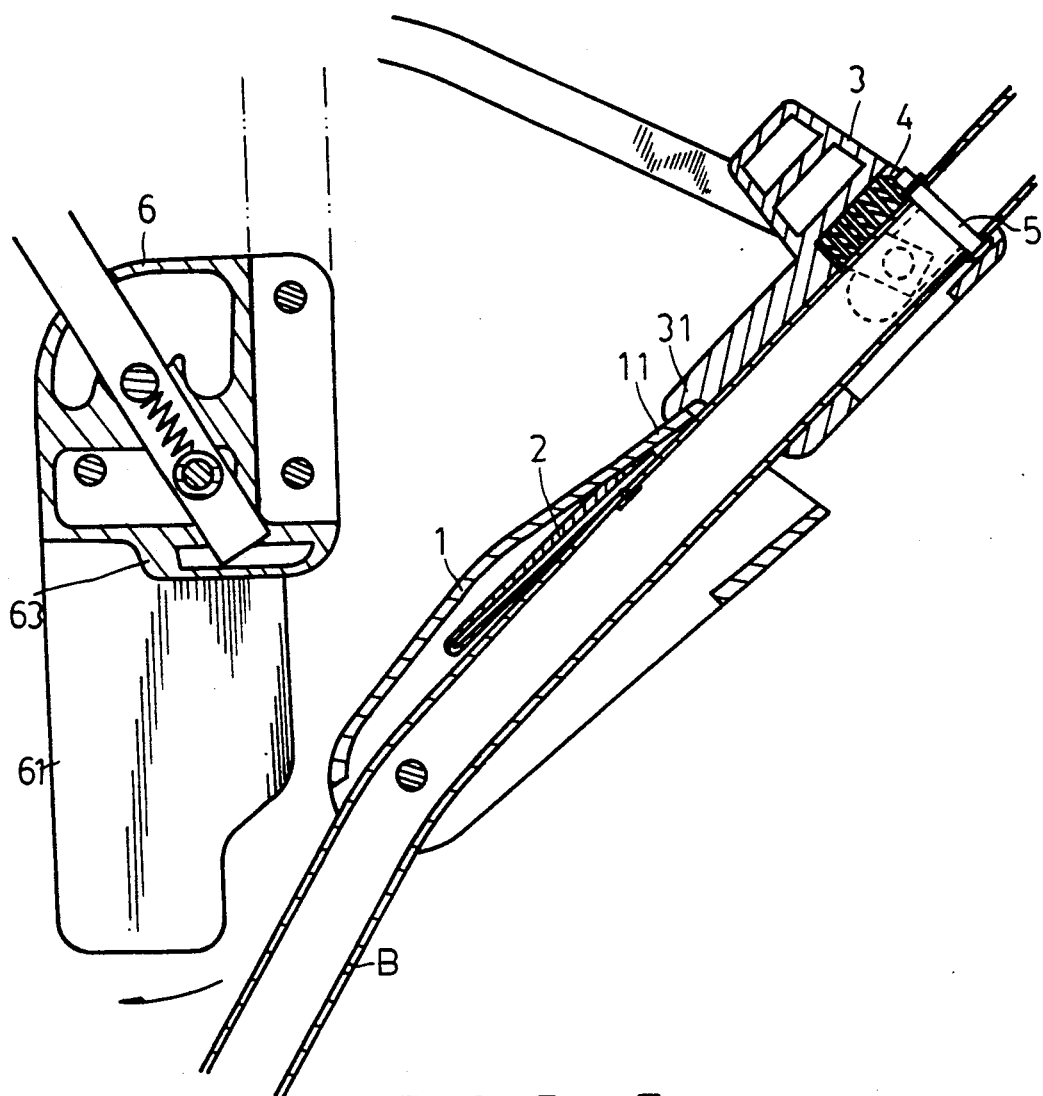
FIG. 5 shows the how the present invention works.
Figure 6:
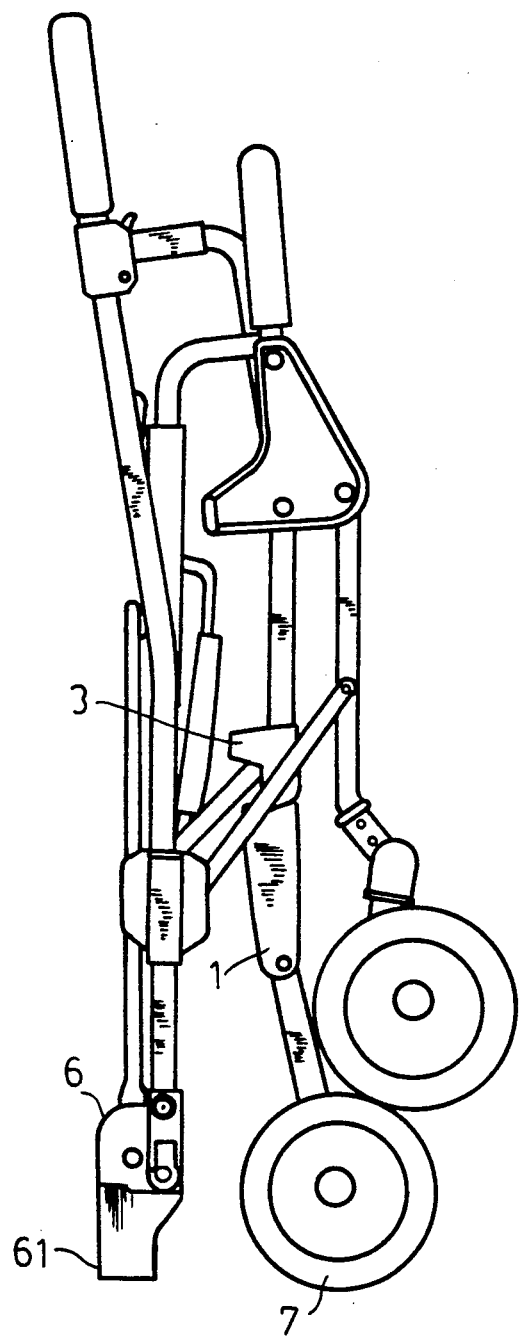
FIG. 6 shows the collapsed state of the present invention.
Figure 7:
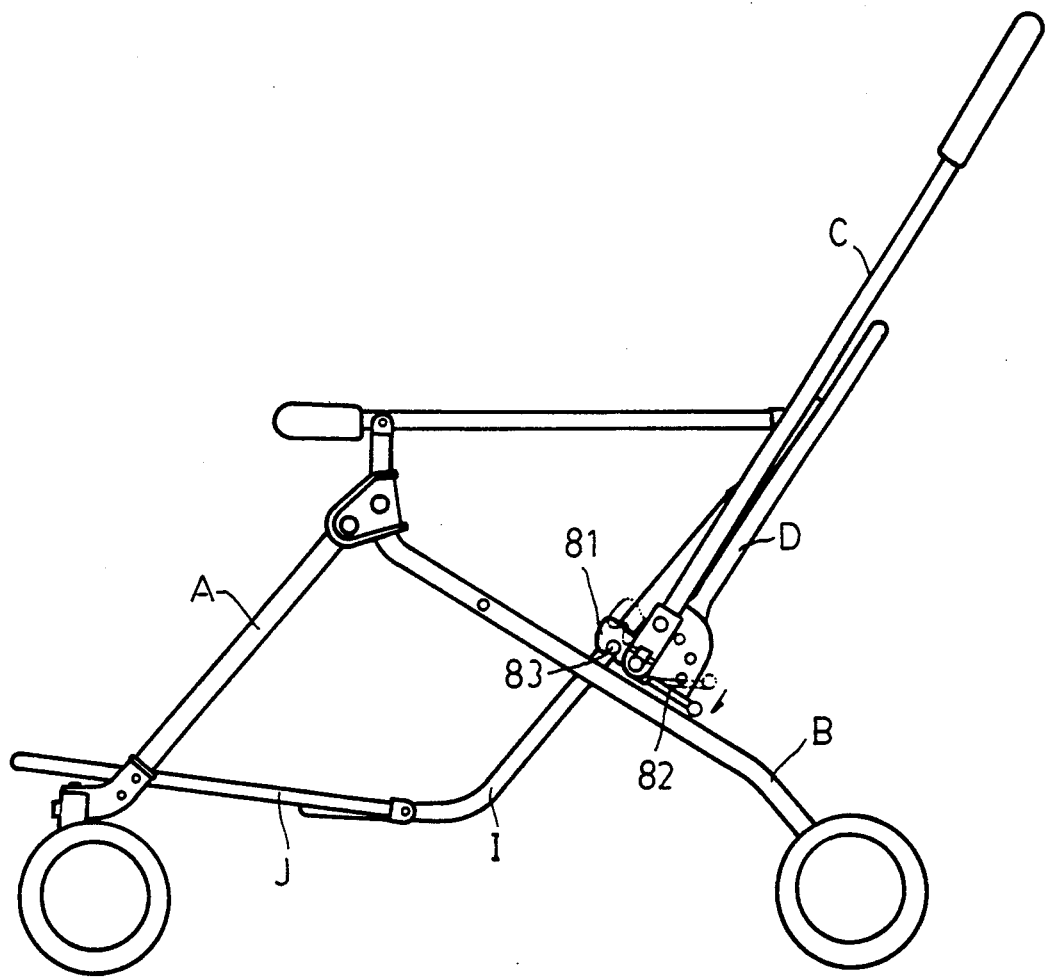
FIG. 7 shows a prior art stroller.

As shown in FIGS. 1 and 3, the stroller according to the present invention is in an expanded state wherein the flange 31 of the engaging member 3 is received in the limit block 6 and applies a force against the upper flat surface of the engaging member 3. Meanwhile, the notch 62 of the limit block 6 just receives the flat surface 11 of the seat member 1. When desired to collapse the stroller, the user may step on the seat member 1 so as to press the leaf spring 2 thereby pushing the seat member 1 towards the rear leg B. As the seat member 1 goes towards the rear leg B, the inclined wall of the recess 12 of the seat member 1 will urge against the engaging member 3 which will then compress the spring 4 and move rearwards until the flat surface 11 of the seat member 1 is located below the flange 31 of the engaging member 3 and the spring 4 pushes the flange 31 of the engaging member 3 downwards to enclose the edge of the flat surface 11 of the seat member 1 (see FIG. 4). When the stop edge 63 of the limit block 6 is no longer confined by the seat member 1, the limit block 6 and the back rest D will be able to swing rearwards (see FIGS. 5 and 6) and finally, the lower actuating portion 61 of the limit block 6 together with the rear wheel 7 will be in contact with the ground (see FIG. 7) hence making it easier to be stowed.

Figure 8:
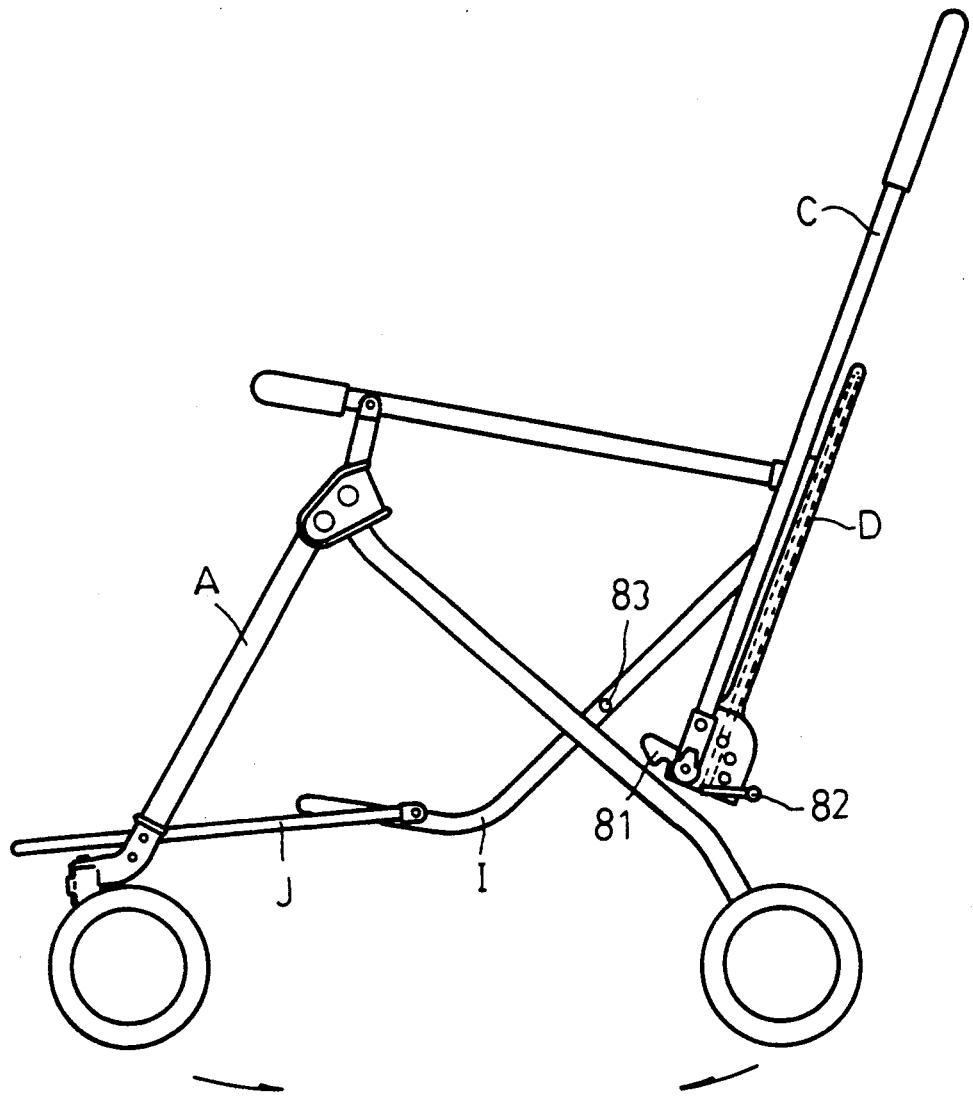
FIG. 8 shows the principle of the prior art stroller.

Both sides of the stroller are symmetric in structure, i.e. the rear leg on both sides is provided with a seat member 1 and an engaging member 3. Of course, both sides of the back rest D has a limit block 6. As stated above, the seat members 1 on two sides are not linked together and so it is necessary to operate both seat members 1 in the same procedures thereby preverting the stroller from being collapsed inadvertently. As to the prior art stroller (see FIGS. 7 and 8), the engaging hooks on both sides are connected together and so when either the press rod or the link rod is pressed, both engaging hooks will detach from the left and right legs. Hence, in case of inadvertent impact or press by the naughty children, the stroller may be easily collapsed thus liably hurting the baby therein.

In conclusion, the seat member 1, the engaging member 3 and the limit block are new components as to the prior art.

I claim:

1. An improved collapsible structure for a stroller comprising front legs, rear legs, handle grip, and a back rest, characterized in that:
   a seat member pivotally connected at one end with the rear leg and having a raised flat surface located at a free end, said flat surface being provided with a recess found in a lower edge;
   an engaging member located on said rear leg has a flange formed on one end thereof and is contiguous the flat surface of said seat member, said flange being received in the recess of the flat surface of said seat member;
   a limit block mounted on the connection between said back rest and said handle grip and having a notch and a stop edge, said stop edge bearing against the upper surface of said flange and said notch receiving the flat surface of said seat member;
   whereby the stroller rear legs and back rest are lockingly coupled to prevent inadvertent collapsing of said stroller.

2. The improved collapsible structure for a stroller as claimed in claim 1, wherein a leaf spring is mounted between the free end of said seat member and the rear leg so that the seat member may be pushed to compress the leaf spring to move said engaging member.

3. The improved collapsible structure for a stroller as claimed in claim 1, wherein said engaging member is formed with a chamber for receiving a spring which is positioned between an inner end of the chamber of said engaging member and a pin located at an outer end of said chamber secured to the rear leg thus enabling said engaging member to move forwards and rearwards.

4. The improved collapsible structure for a stroller as claimed in claim 1, wherein said limit block includes a lower actuating portion displaced from said stop edge engaged with said seat member and said engaging member, said lower actuating portion and the rear wheel being in contact with the ground when the stroller is collapsed.

* * * * *